(12) United States Patent
Takaishi et al.

(10) Patent No.: US 10,578,364 B2
(45) Date of Patent: Mar. 3, 2020

(54) VEHICLE HEAT EXCHANGE APPARATUS

(71) Applicant: Honda Motor Co., Ltd., Tokyo (JP)

(72) Inventors: Toshihiko Takaishi, Wako (JP); Masami Watase, Wako (JP); Tatsuya Yoneyama, Wako (JP); Tatsuya Igarashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 14 days.

(21) Appl. No.: 15/990,356

(22) Filed: May 25, 2018

(65) Prior Publication Data

US 2018/0340735 A1 Nov. 29, 2018

(30) Foreign Application Priority Data

May 29, 2017 (JP) .................. 2017-105545

(51) Int. Cl.
*F28D 1/02* (2006.01)
*B60R 19/48* (2006.01)
(Continued)

(52) U.S. Cl.
CPC ............ *F28D 1/0233* (2013.01); *B60R 19/48* (2013.01); *F16H 57/0417* (2013.01);
(Continued)

(58) Field of Classification Search
CPC ........ B60R 2019/486; B60R 2019/527; B60R 19/48; B60K 11/04; B60K 11/06; B60K 11/08; H16H 57/0417; F28D 1/0233; F28D 2021/0092; F28D 1/0333; B60Y 2306/05; F28F 9/0075; F16H 57/0417
(Continued)

(56) References Cited

U.S. PATENT DOCUMENTS 3,933,136 A * 1/1976 Burst ................ B60K 11/08
123/41.58
4,566,407 A * 1/1986 Peter ................ B60K 11/08
123/41.48
(Continued)

FOREIGN PATENT DOCUMENTS

JP    S60110527 A    6/1985
JP    H02109728 A    4/1990
(Continued)

*Primary Examiner* — Tho V Duong
(74) *Attorney, Agent, or Firm* — Duft & Bornsen, PC (57) ABSTRACT

A vehicle heat exchange apparatus, including: a heat-exchanger provided rearward of a front-bumper formed with an air-intake-port, and having an air-inlet-member on a front-face of the heat-exchanger; and a passage-forming-member provided between the front-bumper and the heat-exchanger, and forming a passage for passing cooling-air from the air-intake-port of the front-bumper to the air-inlet-member of the heat-exchanger, wherein the heat-exchanger is provided inclined so that an upper-end-portion is positioned rearward of a lower-end-portion, the passage-forming-member has: a duct-member having: a top-member; a bottom-member facing the top-member; and a pair of side-members interconnecting the top-member and the bottom-member, and forming a part of the passage with a space enclosed by the top-member, the bottom-member and the pair of side-members; and a closing-member provided to close a gap between the top-member of the duct-member and the upper-end-portion of the heat-exchanger.

16 Claims, 9 Drawing Sheets

(51) Int. Cl.
*F16H 57/04* (2010.01)
*F28F 9/013* (2006.01)
*F28F 9/007* (2006.01)
*F28D 1/03* (2006.01)
*F28D 21/00* (2006.01)

(52) U.S. Cl.
CPC .......... *F28D 1/0333* (2013.01); *F28F 9/0075* (2013.01); *F28F 9/0131* (2013.01); *B60R 2019/486* (2013.01); *B60Y 2306/05* (2013.01); *F28D 2021/0089* (2013.01); *F28D 2021/0092* (2013.01)

(58) Field of Classification Search
USPC .................................................... 165/41, 44
See application file for complete search history.

(56) References Cited

U.S. PATENT DOCUMENTS 4,706,615 A * 11/1987 Scadding ................ F01P 11/10
123/198 E
5,219,016 A 6/1993 Bolton et al.
7,451,844 B2 * 11/2008 Kunikata ................ B60K 11/04
180/68.1
8,196,978 B2 * 6/2012 Shin ...................... B62D 25/084
180/68.6
9,308,914 B1 4/2016 Sun
2010/0282533 A1 * 11/2010 Sugiyama ........... B60K 11/085
180/68.1
2012/0325324 A1 * 12/2012 Widmer ............... B62D 25/084
137/1
2015/0041229 A1 2/2015 Maurer et al.

FOREIGN PATENT DOCUMENTS

| JP | H0596960 A | 4/1993 |
| JP | H09264134 A | 10/1997 |
| JP | 2000177406 A | 6/2000 |
| JP | 2005053464 A | 3/2005 |
| JP | 2005206060 A | 8/2005 |
| JP | 2007001503 A | 1/2007 |
| JP | 2015160532 A | 9/2015 |
| JP | 2016010992 A | 1/2016 |
| KR | 20110063116 A | 6/2011 |

* cited by examiner

VEHICLE HEAT EXCHANGE APPARATUS

CROSS-REFERENCE TO RELATED APPLICATION

This application is based upon and claims the benefit of priority from Japanese Patent Application No. 2017-105545 filed on May 29, 2017, the content of which is incorporated herein by reference.

BACKGROUND OF THE INVENTION

Field of the Invention

This invention relates to a vehicle heat exchange apparatus which has an air-cooled heat exchanger mounted on a vehicle.

Description of the Related Art

Apparatuses of this type are known that comprise an oil cooler serving as a heat exchanger installed forward of a front wheel housing and have a cooling airflow intake structure adapted to guide cooling airflow introduced through a front bumper air inlet to the oil cooler. For example, a structure described in Japanese Unexamined Patent Publication No. 2000-177406 (JP2000-177406A) has an air intake passage forming member installed between the front bumper and the oil cooler, and an oil cooler air guide for guiding cooling airflow to the oil cooler is installed in the air intake passage forming member.

But as heat load of various equipment mounted in vehicles has increased in recent years, a need has arisen to increase heat exchanger heat exchange quantity (heat exchange capacity), and meeting this need would ordinarily be expected to lead to larger heat exchanger size. However, increasing heat exchanger size is not practical because, as stated in JP2000-177406A, for example, a heat exchanger generally has to be installed in a space of limited size in vehicle height direction.

SUMMARY OF THE INVENTION

An aspect of the present invention is a vehicle heat exchange apparatus, including: a heat exchanger provided rearward of a front bumper formed with an air intake port, and having an air inlet member on a front face of the heat exchanger; and a passage forming member provided between the front bumper and the heat exchanger, and forming a passage for passing cooling air from the air intake port of the front bumper to the air inlet member of the heat exchanger, wherein the heat exchanger is provided inclined so that an upper end portion is positioned rearward of a lower end portion, the passage forming member has: a duct member having: a top member; a bottom member facing the top member; and a pair of side members interconnecting the top member and the bottom member, and forming a part of the passage with a space enclosed by the top member, the bottom member and the pair of side members; and a closing member provided to close a gap between the top member of the duct member and the upper end portion of the heat exchanger.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

An embodiment of the present is explained with reference to FIGS. 1 to 8 in the following. The vehicle heat exchange apparatus according this embodiment of the present invention comprises an air-cooled heat exchanger installed behind a front bumper and is configured to guide cooling airflow to this heat exchanger from outside the vehicle. One example of a heat exchanger usable in the present embodiment is an ATF cooler for cooling ATF (Automatic Transmission Fluid), i.e., hydraulic oil and lubricating oil of an automatic transmission. ATF can also be used as a coolant oil for cooling, for example, an electric motor or the like installed inside a transmission case. This can be seen from the fact that electric motors used as vehicle power sources in hybrid vehicles, electric vehicles and the like are cooled using ATF.

Figure 1:
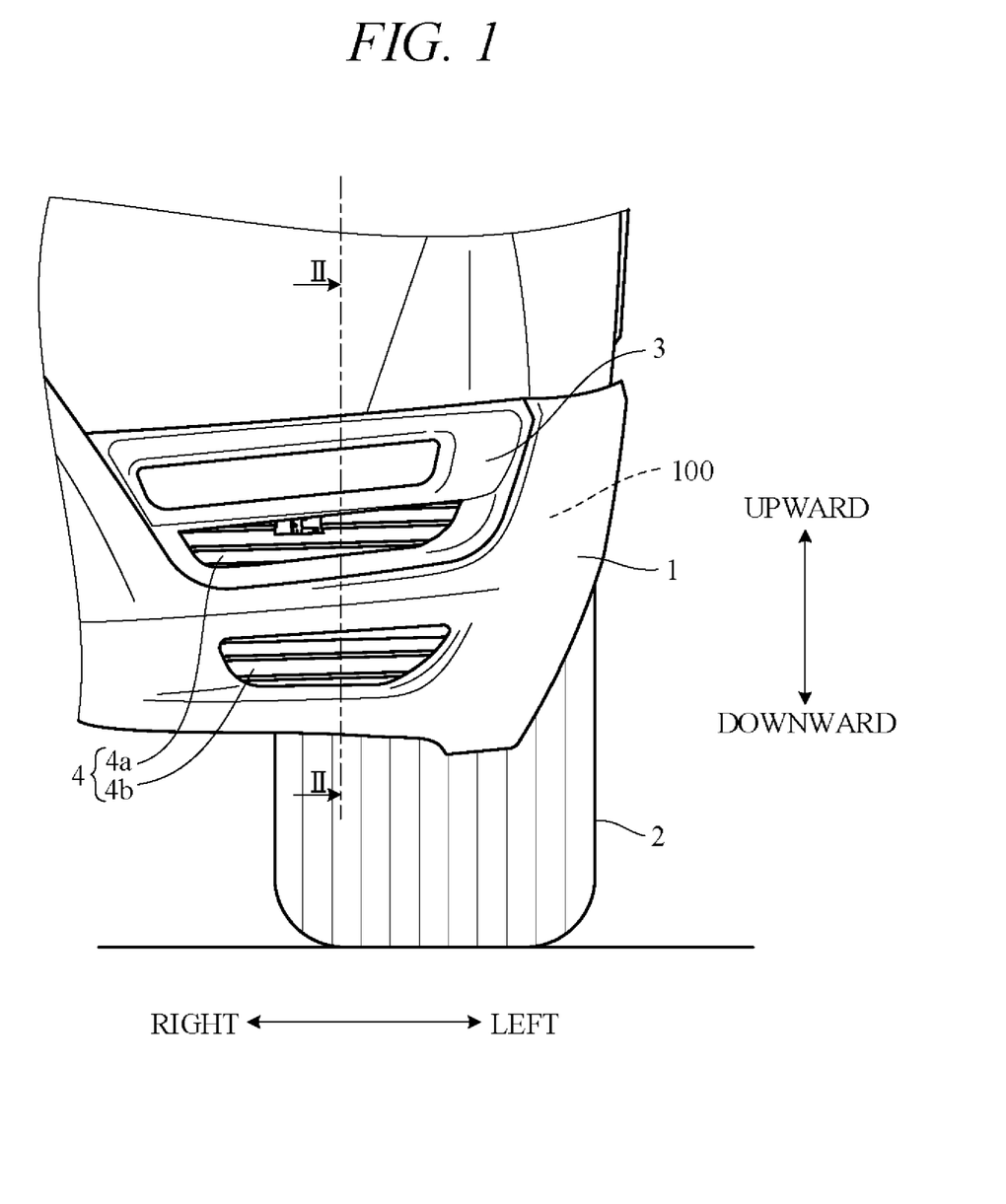
FIG. 1 is a front view from ahead of a vehicle showing a lower left side portion of a vehicle to which a vehicle heat exchange apparatus according to an embodiment of the present invention is applied.
Figure 2:
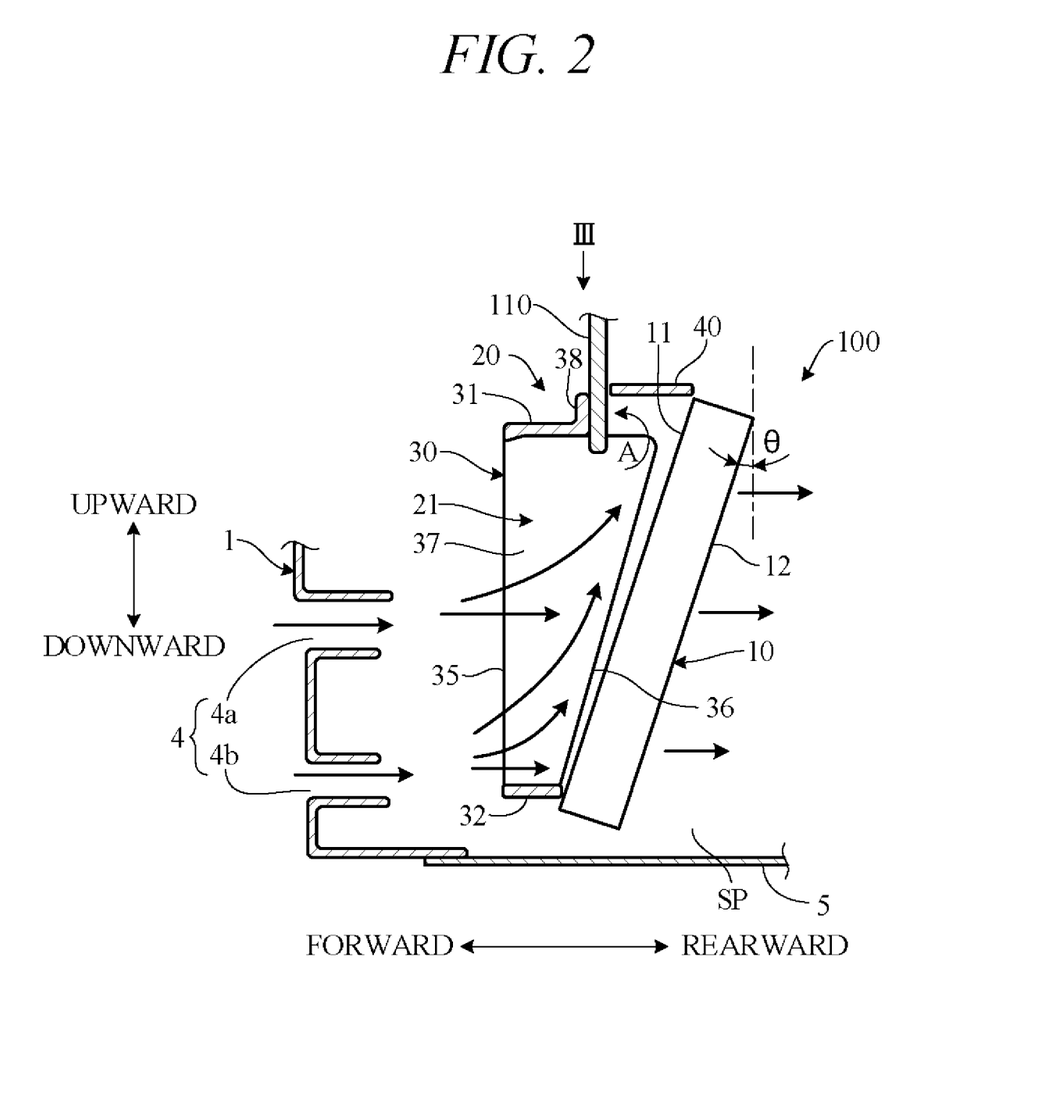
FIG. 2 is a cross-sectional view cut along line II-II of FIG. 1.
Figure 3:
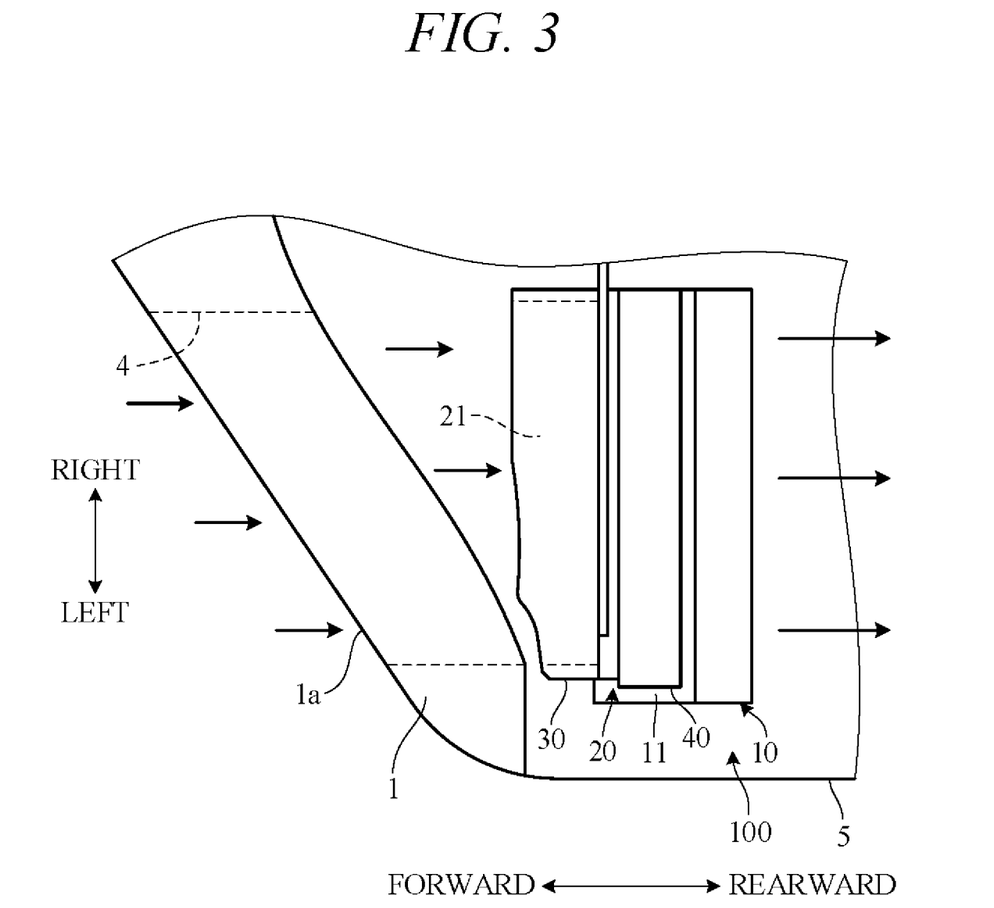
FIG. 3 is a view on arrow III of FIG. 2.

FIG. 1 is a front view from ahead of a vehicle showing a lower left side portion of a vehicle to which a vehicle heat exchange apparatus 100 according to an embodiment of the present invention is applied, and FIGS. 2 and 3 are respectively a cross-sectional diagram (cross-sectional view cut along line II-II of FIG. 1) and a plan view (view on arrow III of FIG. 2) schematically illustrating essential components of the vehicle heat exchange apparatus 100. For convenience in the following, vehicle forward-rearward direction (longitudinal direction), left-right direction (lateral direction) and upward-downward direction (height direction) are defined as seen in the FIGS. 1 to 3 and components are explained in accordance with this definition.

As shown in FIG. 1, a front bumper 1 is attached to the front end of the vehicle. The front bumper 1, although only partially illustrated, has a front surface smoothly formed substantially arcuate (convex surface-like) in forward-rearward direction from a laterally middle portion to opposite lateral end portions. Therefore, the lateral middle portion of the front bumper 1 is located farthest forward and opposite lateral end portions thereof are located farthest rearward (see FIG. 3). A component mount 3 for mounting a fog lamp or other electrical component is provided at the left end portion of the front bumper 1, namely, in front of a left front wheel 2, and a pair of vertically spaced air intake ports 4, namely, an upper air intake port 4a and a lower air intake port 4b, are formed below the component mount 3.

As shown in FIGS. 2 and 3, the air intake ports 4 are through holes passing through the front bumper 1 in forward-rearward direction, and are provided in a slanted region 1a of the front bumper 1 slanting rearward toward the left. An underbar 5 is attached to a bottom face of the front bumper 1, and an ATF cooler 10 is installed in a housing space SP rearward of the front bumper 1 and upward of the underbar 5. In other words, the ATF cooler 10 is installed behind the vehicle left side air intake ports 4 and forward of the left front wheel 2 (FIG. 1).

The ATF cooler 10 is connected to an automatic transmission (not shown). In the present embodiment, the ATF cooler 10 is installed behind the left side air intake ports 4 taking into consideration ease of routing piping for interconnecting the ATF cooler 10 and the automatic transmission. The ATF cooler 10 can alternatively be installed some other location (e.g., behind the right end portion of the front bumper 1) depending on where the automatic transmission is installed.

As shown in FIG. 2, the ATF cooler 10 has an air inlet 11 on its front face and an air outlet 12 on its rear face and the distance between the air inlet 11 and the air outlet 12, i.e., the thickness of the ATF cooler 10, is substantially constant throughout (both vertically and laterally) the ATF cooler 10. The ATF cooler 10 is installed with the air inlet 11 facing forward and so as to incline obliquely so that its upper end is positioned more rearward than its lower end. In other words, the ATF cooler 10 is installed at a predetermined angle θ (e.g., 18°) with respect to vertical. The lower end portion of the air inlet 11 is positioned at substantially the same height as the lower air intake port 4b of the front bumper 1, and the upper end portion of the air inlet 11 is positioned upward of the upper air intake port 4a. For example, the air intake ports 4a and 4b are positioned below the vertical middle of the air inlet 11.

A passage forming member 20 formed with a passage 21 for guiding to the ATF cooler 10 cooling airflow introduced from ahead of the vehicle through the air intake ports 4 into the housing space SP is provided between the front bumper 1 and the ATF cooler 10. The passage forming member 20 comprises a duct member 30 installed forward of the ATF cooler 10 and an upper plate 40 installed between upper end of the duct member 30 and upper end of the ATF cooler 10. Thus, the vehicle heat exchange apparatus 100 of the present embodiment comprises the ATF cooler 10 and the passage forming member 20 (duct member 30 and upper plate 40).

Figure 4A:
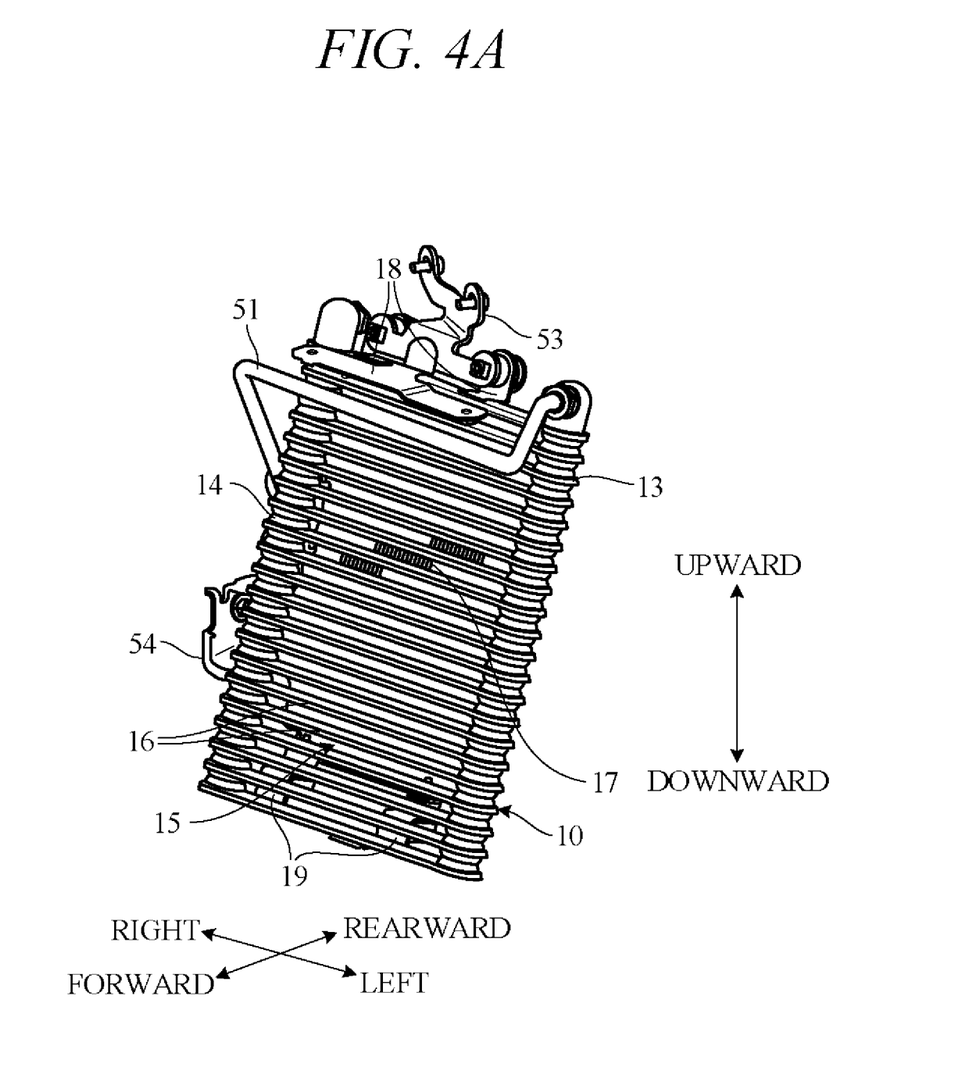
FIG. 4A is a perspective front view of an ATF cooler constituting the vehicle heat exchange apparatus according to the embodiment of the present invention, viewed obliquely from the left.
Figure 4B:
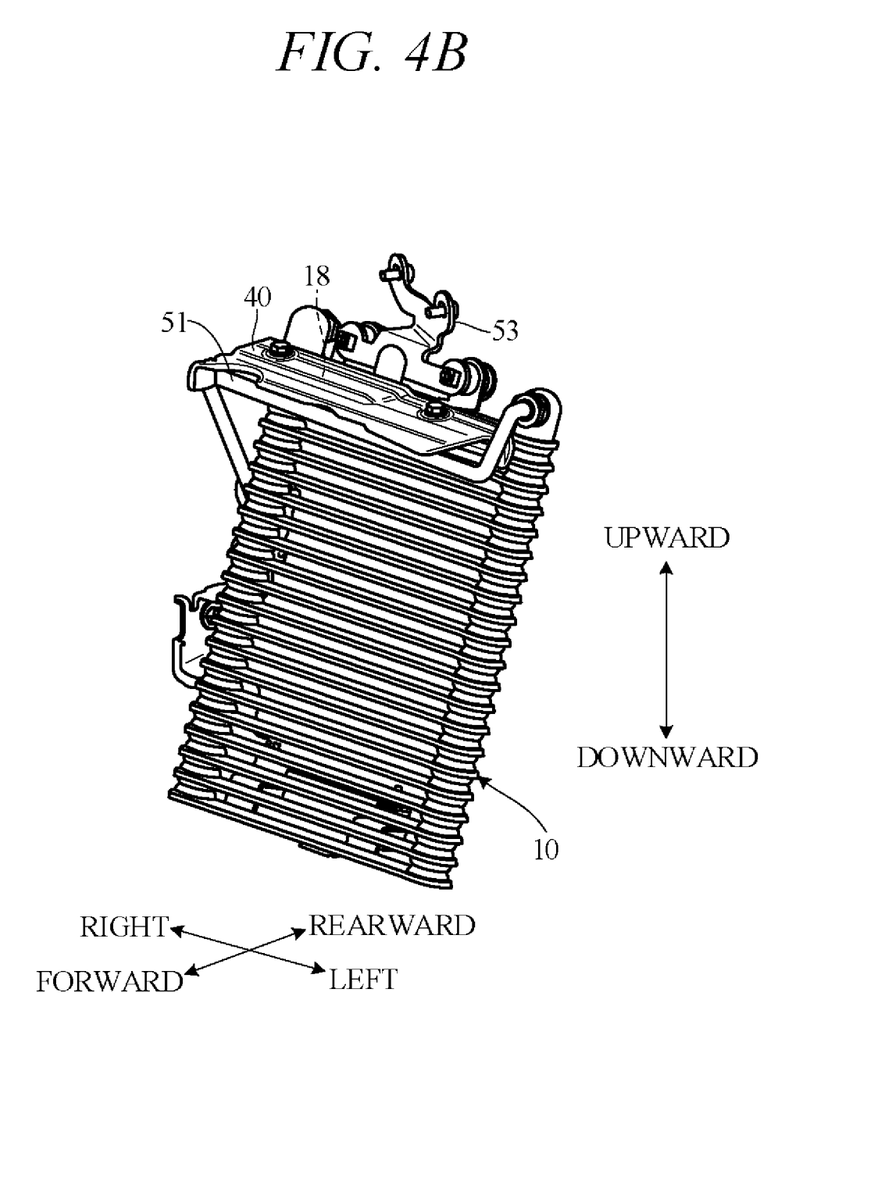
FIG. 4B is a perspective front view of an ATF cooler and an upper plate constituting the vehicle heat exchange apparatus according to the embodiment of the present invention, viewed obliquely from the left.
Figure 5:
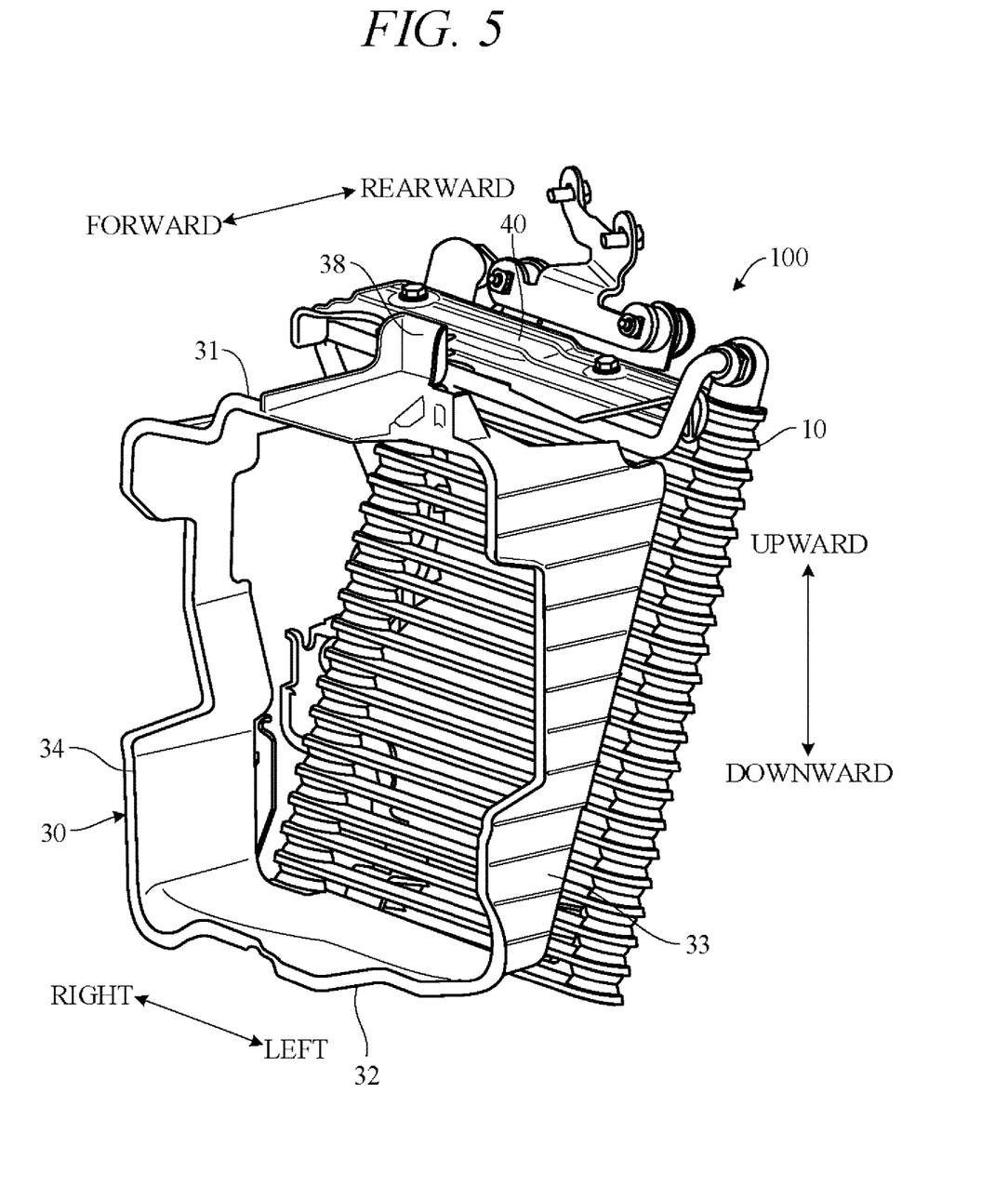
FIG. 5 is a perspective front view of the vehicle heat exchange apparatus according to the embodiment of the present invention, viewed obliquely from the left.

FIG. 4A is a perspective front view of part of the vehicle heat exchange apparatus 100, mainly the ATF cooler 10, viewed obliquely from the left; FIG. 4B is a perspective front view of the ATF cooler 10 and the upper plate 40 viewed obliquely from the left; and FIGS. 5 and 6 are perspective front views of the whole vehicle heat exchange apparatus 100 viewed obliquely from the left and obliquely from the right.

As shown in FIG. 4A, the ATF cooler 10 has a pair of left and right header pipes 13 and 14, and a cooler core 15 provided inward of the left and right header pipes 13 and 14. The cooler core 15 extends laterally and is connected to the left and right header pipes 13 and 14. The cooler core 15 comprises multiple parallel arranged, vertically equispaced tubes 16, and fins 17 (only a few shown) disposed between adjacent tubes 16. The air inlet 11 and the air outlet 12 (FIG. 2) are provided on the front face and rear face of the cooler core 15. AFT is cooled in the ATF cooler 10 by heat exchange with cooling airflow passing through the cooler core 15 from front to rear.

Figure 6:
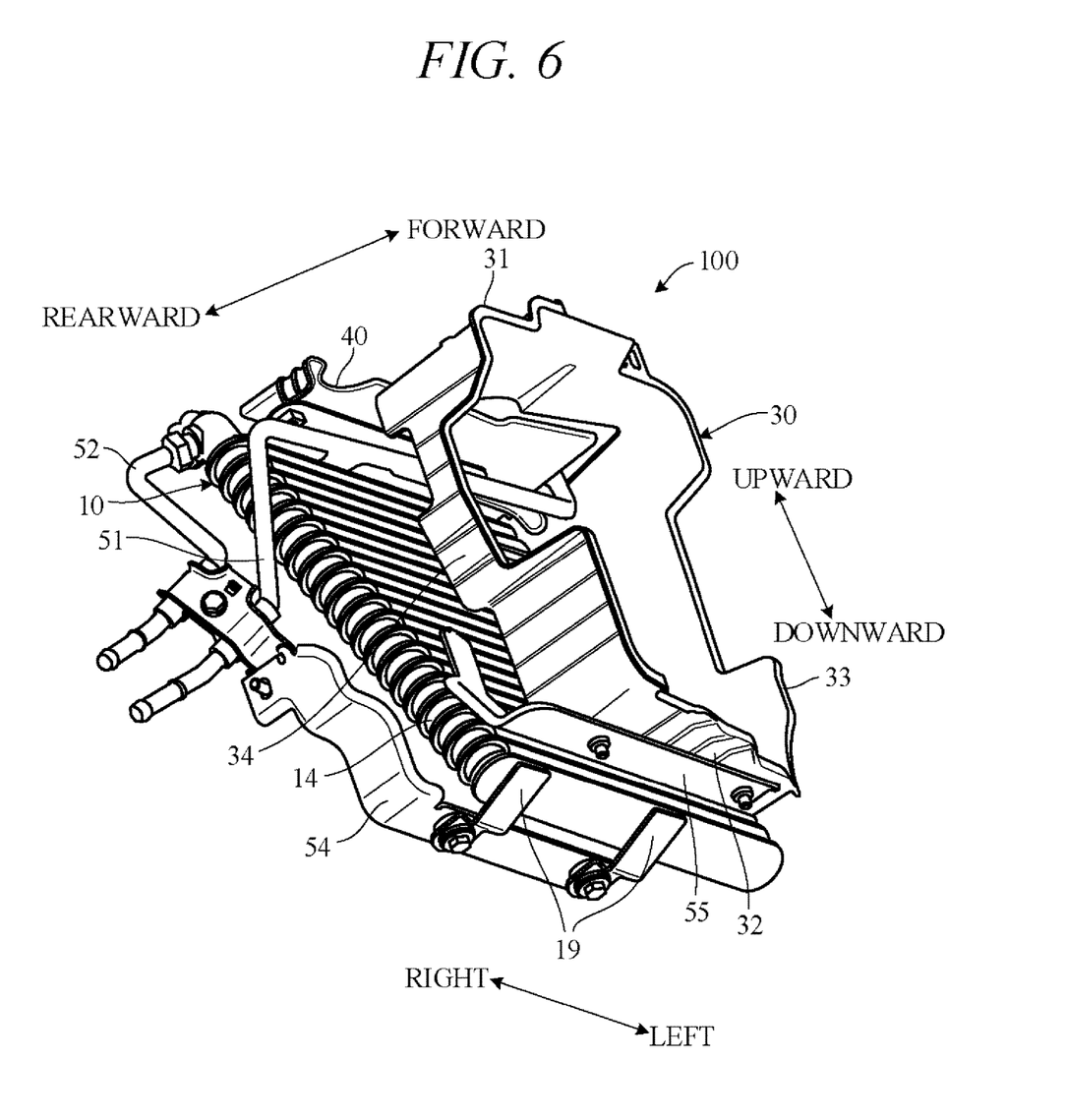
FIG. 6 is a perspective front view of the vehicle heat exchange apparatus according to the embodiment of the present invention, viewed obliquely from the right.

As shown in FIG. 4A and FIG. 6, a pipe 51 for inflow of ATF to the ATF cooler 10 and a pipe 52 for outflow of ATF from the ATF cooler 10 are connected to the upper ends of the left and right header pipes 13 and 14, respectively. The pipe 52 connected to the header pipe 14 on the right side extends on the right of the ATF cooler 10, and the pipe 51 connected to the header pipe 13 on the left side passes across the front of the upper end of the ATF cooler 10 and then extends on the right of the ATF cooler 10. In addition, the pipes 51 and 52 extend vertically along the vertical face on the right of the ATF cooler 10 similarly to the header pipe 14.

Stays 18 are welded or otherwise fastened to the upper end of the cooler core 15 of the ATF cooler 10 as shown in FIG. 4A. An upper bracket 53 is fastened to the stays 18 by bolts and sandwiched mount rubbers. The upper bracket 53 extends upward and rearward to be bolted to an unshown vehicle body frame.

As shown in FIG. 4A and FIG. 6, stays 19 are welded or otherwise fastened to the lower end of the cooler core 15 of the ATF cooler 10. A lower bracket 54 is fastened to the stays 19 by bolts and sandwiched mount rubbers. The lower bracket 54 extends upward on the right of the ATF cooler 10 to be bolted to the vehicle body frame. In other words, the upper end and lower end of the ATF cooler 10 are supported from the unshown vehicle body frame by the brackets 53 and 54. The pipes 51 and 52 are supported by the distal end (right side upper end) of the lower bracket 54.

As shown in FIG. 4B, the upper plate 40 is fastened to the stays 18 by bolts. The upper plate 40 is a substantially rectangular plate member of a width (lateral length) approximately equal to that of the ATF cooler 10 and extends forward across the top of the pipe 51.

As shown in FIGS. 5 and 6, the duct member 30 is structured in an overall frame-like shape comprising a top member 31, a bottom member 32 facing the top member 31, and left and right side members 33 and 34 interconnecting the top member 31 and the bottom member 32. As shown in FIG. 2, a front opening 35 and a rear opening 36 are formed at the front and rear of the duct member 30, thereby forming a passage 37 inside the duct member 30 that extends from the front opening 35 to the rear opening 36 and constitutes part of the passage 21. The rear opening 36 is formed to face the air inlet 11 of the ATF cooler 10, so that cooling airflow passing through the passage 37 is guided to the air inlet 11. The top member 31 of the duct member 30 is positioned forward of and lower than the upper plate 40, and the bottom member 32 thereof is positioned forward of the lower end of the ATF cooler 10.

Figure 7:
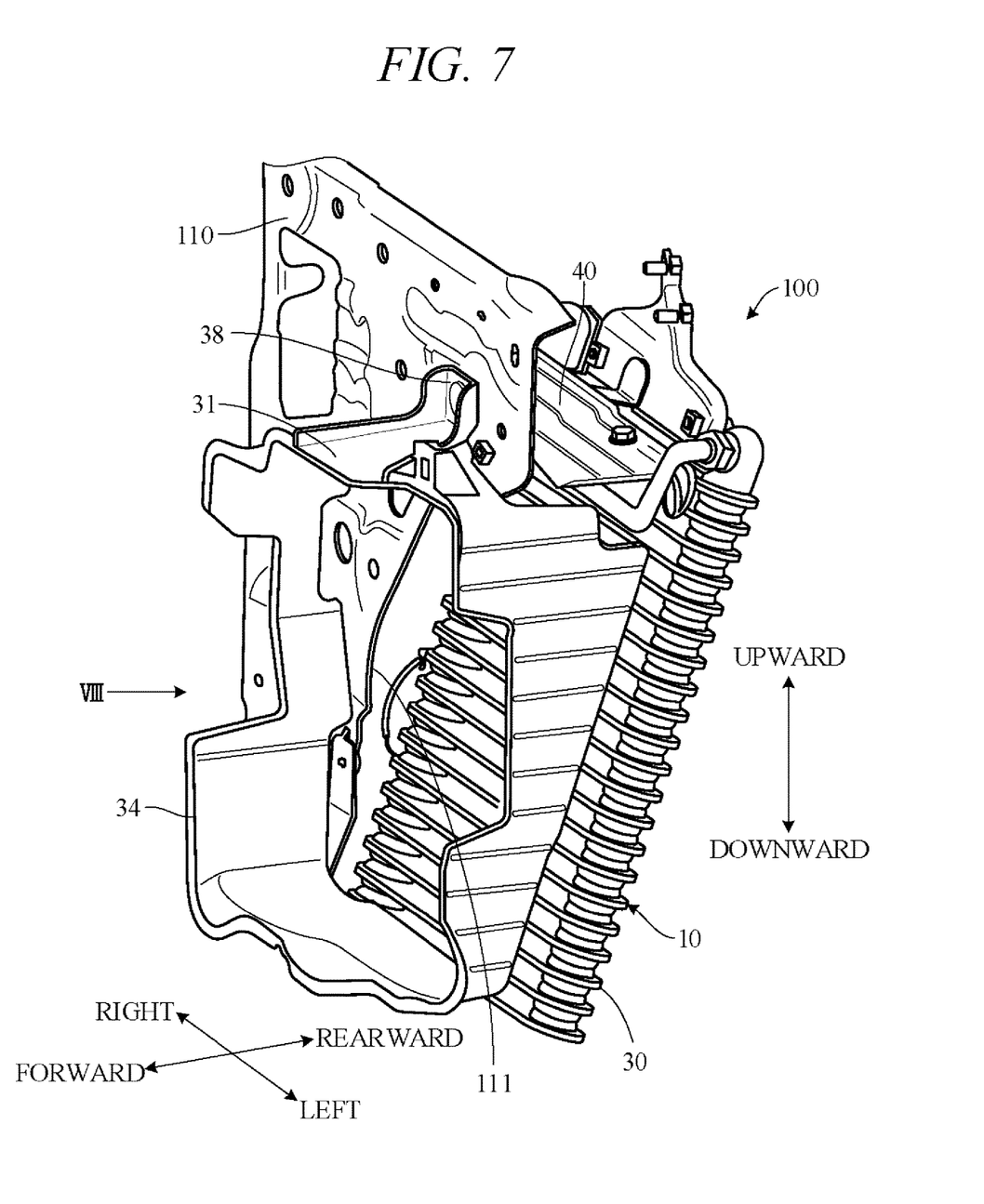
FIG. 7 is a perspective view showing the vehicle heat exchange apparatus according to the embodiment of the present invention and part of a vehicle body frame.
Figure 8:
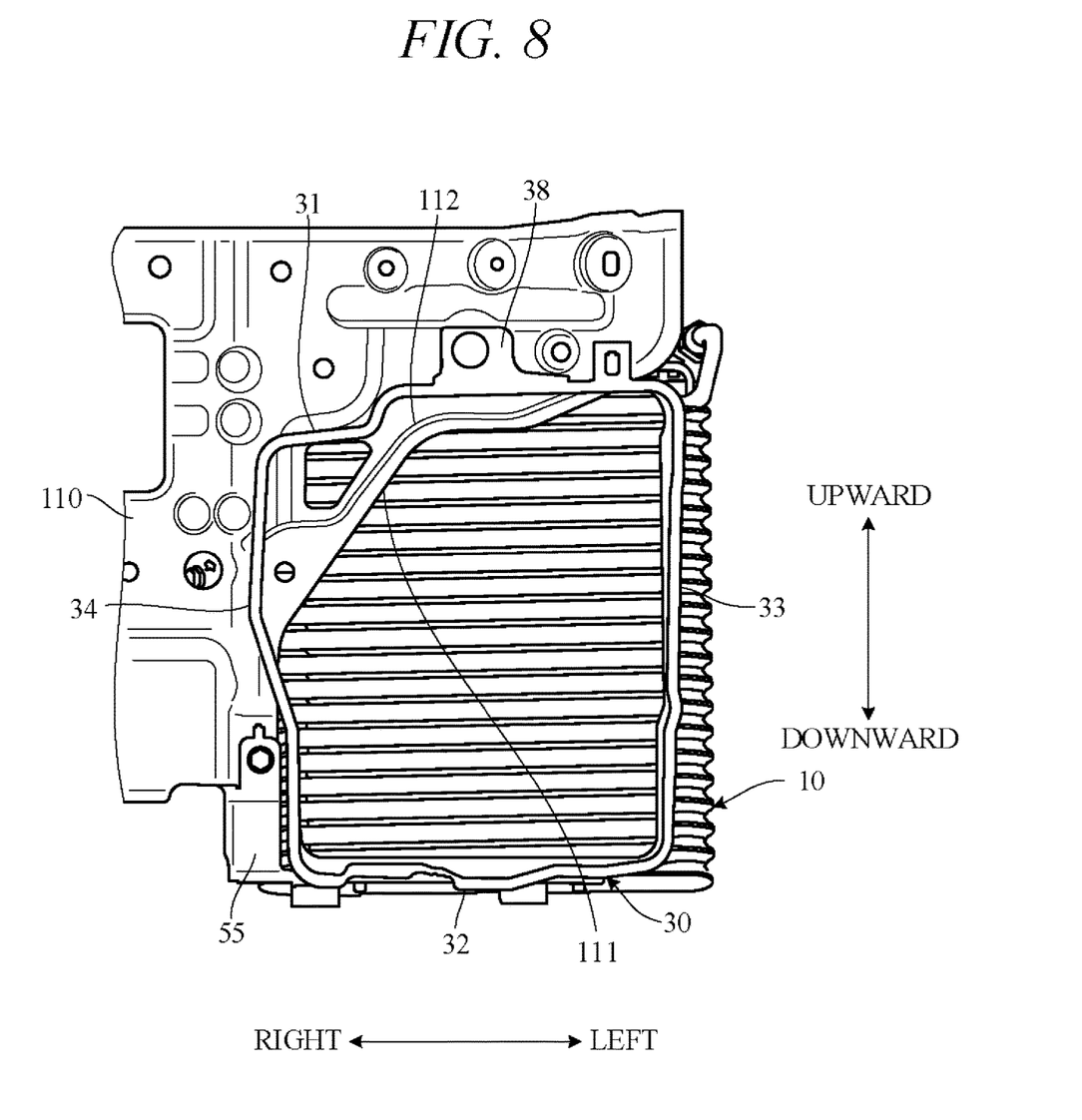
FIG. 8 is a view on arrow VIII of FIG. 7.

The duct member 30 is fastened to the vehicle body frame. FIG. 7 is a perspective view showing a vehicle body frame member 110 for attaching the vehicle heat exchange apparatus 100 and duct members, and FIG. 8 is a view on arrow VIII of FIG. 7 (view from the front). As shown in FIGS. 7 and 8, the substantially rectangular vehicle body frame member 110 is located rearward and rightward of the duct member 30.

The vehicle body frame member 110 extends vertically and laterally, and part of the vehicle body frame member 110 is interposed between the right side member 34 of the duct member 30 and the ATF cooler 10 and between the top member 31 of the duct member 30 and the upper plate 40. Specifically, an edge region 111 of the vehicle body frame member 110 is interposed from a vertical middle region of the right side member 34 of the duct member 30 to a right end region of the top member 31. A reinforcing rib 112 is provided near the edge region 111 of the vehicle body frame member 110. An upward projecting flange 38 is provided on the top member 31 of the duct member 30, and the flange 38 is fastened to the vehicle body frame member 110 by a bolt. As shown in FIG. 5, left and right edge regions of the flange 38 are bent forward in the shape of ribs.

As shown in FIG. 6, a bracket 55 is fastened to the bottom member 32 of the duct member 30 through mount rubbers. The bracket 55 projects rightward of the bottom member 32 of the duct member 30, whereafter it extends upward rightward of the right side member 34. As shown in FIG. 8, a right end portion of the bracket 55 is bolted to the vehicle body frame member 110. As a result, the upper end and lower end of the duct member 30 are supported from the vehicle body frame member 110.

The vehicle heat exchange apparatus 100 according to the present embodiment operates follows. As shown in FIG. 2, during vehicle running, cooling airflow (running wind) enters the air intake ports 4 of the front bumper 1 and flows from the front of the vehicle into the passage 37 (part of the passage 21) inside the duct member 30. Part of the cooling airflow entering the passage 37 passes through a lower region of the ATF cooler 10 and the remainder passes obliquely upward along a front face of the ATF cooler 10. The obliquely upward cooling airflow collides with the upper plate 40, whereby outflow of cooling air from a near side top region of the ATF cooler 10 is prevented, namely, outflow of cooling air from the passage 21 without passing through the ATF cooler 10 is blocked.

Therefore, as indicated by arrow A in FIG. 2, cooling airflow stagnates (a stagnant region forms) in a top zone of the passage 21, particularly in a region under the upper plate 40 and rearward of the vehicle body frame member 110 that projects to below the top member 31 of the duct member 30. The occurrence of the stagnant region occurs because of the abrupt expansion of passage area behind the vehicle body frame member 110. Owing to the inclination of the ATF cooler 10 so as to taper the passage 21 from an upper region forward in side view and to the formation of the stagnant region under the upper plate 40 in this manner, passage of cooling airflow at the upper region of the passage 21 (rearward of the stagnant region) can be promoted, whereby air quantity passing through the ATF cooler 10 at a level higher than the air intake ports 4 can be increased. Since cooling airflow can therefore be guided evenly to throughout the ATF cooler 10, quantity of heat exchange between ATF and cooling airflow in (heat exchange capacity of) the ATF cooler 10 can be increased.

The present embodiment can achieve advantages and effects such as the following:

(1) The vehicle heat exchange apparatus 100 includes the ATF cooler 10 that is installed rearward of the front bumper 1 formed with the air intake ports 4 and has the substantially rectangular air inlet 11 on its front face, and the passage forming member 20 that is installed between the front bumper 1 and the ATF cooler 10 and forms the passage 21 for passing cooling airflow from the air intake ports 4 of the front bumper 1 to the air inlet 11 of the ATF cooler 10 (FIGS. 2 and 3). The ATF cooler 10 is installed to incline obliquely so that its upper end is positioned more rearward than its lower end (FIG. 2). The passage forming member 20 has the duct member 30 having the top member 31, the bottom member 32 facing the top member 31, and the pair of side members 33 and 34 interconnecting the top member 31 and the bottom member 32 and forming the passage 37 that is part of the passage 21 in the space enclosed by the top member 31, bottom member 32 and the pair of side members 33 and 34 and the upper plate 40 installed to close a gap between the top member 31 of the duct member 30 and the top of the ATF cooler 10 (FIGS. 2 and 5).

Owing to the oblique installation of the ATF cooler 10 as describe above, an ATF cooler whose enlarged cooler core 15 includes a large number of tubes 16 (number of tube stages), i.e., a large-sized ATF cooler 10, can be accommodated in the housing space SP of limited vertical and lateral size behind the front bumper 1. Moreover, since the passage 21 is formed by the duct member 30 and the upper plate 40 to extend from the air intake ports 4 to the ATF cooler 10, cooling airflow quantity passing through the upper side portion of the ATF cooler 10 can be increased while inhibiting outflow of cooling air from the passage 21 that passes upward between the duct member 30 and the ATF cooler 10. As a result, heat exchange quantity of the ATF cooler 10 can be increased, so as, for example, to easily deal with increase in heat load of motors and the like cooled by ATF.

(2) The upper plate 40 is provided to extend horizontally at a level higher than the top member 31 of the duct member 30 (FIG. 2). Since this facilitates occurrence of cooling airflow stagnation in a region under the upper plate 40, heat exchange efficiency of the ATF cooler 10 improves owing to increased cooling airflow quantity passing rearward from the stagnant region, i.e., through the upper side portion of the ATF cooler 10.

(3) The vehicle body frame member 110 is installed between the top member 31 of the duct member 30 and the upper plate 40 to project downward beyond the top member 31 of the duct member 30 (FIG. 2). Since this further facilitates occurrence of cooling airflow stagnation under the upper plate 40, flow of cooling air passing throughout the ATF cooler 10 can be more strongly promoted.

(4) The duct member 30 has the flange 38 projecting from the top member 31 and is fastened to the vehicle body frame member 110 through the flange 38 (FIGS. 5 and 8). The frame-like duct member 30, which is exposed to wind force when the vehicle is running, can therefore be firmly retained.

(5) The edge region 111 of the vehicle body frame member 110 is formed so as to protrude into the inner space of the duct member 30 and the reinforcing rib 112 is provided in the vicinity of the edge region 111 (FIG. 8). Since this upgrades the strength of the vehicle body frame member 110, its area, particularly the area thereof overlying the front face of the cooler core 15 of the ATF cooler 10, can be reduced. Since cooling airflow can therefore be more evenly guided to throughout the cooler core 15, heat exchange quantity in the ATF cooler 10 can be increased.

Although the aforesaid embodiment represents an example in which the vehicle heat exchange apparatus 100 is utilizes the ATF cooler 10, the present invention can also utilize an intercooler or other type of air-cooled heat exchanger. Moreover, the heat medium used in the vehicle heat exchanger is not limited ATF but can be of another type. The vehicle heat exchange apparatus need not be installed at the lower left side portion of the vehicle but can instead be installed at the right front, lateral middle, or some other part of the vehicle. Although the air intake ports 4a and 4b are provided at two vertically spaced locations of the front bumper 1 in the aforesaid embodiment, the number of air intake ports is not limited to two and, for example, provision of an air intake port at only one location also possible.

In the aforesaid embodiment, the upper plate 40 is provided between the duct member 30 and the ATF cooler 10, but the blocking member is not limited to this configuration and can be of any arrangement capable of blocking the gap the inclination of the ATF cooler 10 causes between the top member 31 of the duct member 30 and the upper end of the ATF cooler 10. In the aforesaid embodiment, the upper plate 40 is disposed horizontally above the top member 31 of the duct member 30, but instead of being oriented horizontally, the upper plate 40 can, for example, be arranged obliquely vertical, and the height relationship between the duct member and the top member and the mode of blocking member installation are not limited to those described in the foregoing. In the aforesaid embodiment, the vehicle body frame member 110 is provided between the top member 31 of the duct member 30 and the upper plate 40 so as to protrude downward of the top member 31, but the vehicle body frame member is not limited to the aforesaid configuration and can, for example, be provided so as not to protrude from the top member 31.

The above embodiment can be combined as desired with one or more of the above modifications. The modifications can also be combined with one another.

According to the present invention, it is possible to easily install a large-sized heat exchanger in a space of limited vertical size and to guide cooling airflow to whole front face of the heat exchanger, enabling to increase heat exchange quantity of the heat exchanger.

Above, while the present invention has been described with reference to the preferred embodiments thereof, it will be understood, by those skilled in the art, that various changes and modifications may be made thereto without departing from the scope of the appended claims.

What is claimed is:

1. A vehicle heat exchange apparatus, comprising:
  a heat exchanger provided rearward of a front bumper formed with an air intake port, and having an air inlet member on a front face of the heat exchanger; and
  a passage forming member provided between the front bumper and the heat exchanger, and forming a passage for passing cooling air from the air intake port of the front bumper to the air inlet member of the heat exchanger, wherein
  the heat exchanger is provided inclined so that an upper end portion is positioned rearward of a lower end portion,
  the passage forming member has:
    a duct member having: a top member; a bottom member facing the top member; and a pair of side members interconnecting the top member and the bottom member, and forming a part of the passage with a space enclosed by the top member, the bottom member and the pair of side members;
    a flange member projected upward from the top member, and fastened to a vehicle body frame; and
    a closing member installed between the vehicle body frame and the upper end portion of the heat exchanger, wherein
    the top member and the bottom member of the duct member are extended horizontally, wherein
    the closing member is extended horizontally above the top member of the duct member.

2. The vehicle heat exchange apparatus according to claim 1, wherein
  the vehicle body frame projects below the top member of the duct member between the flange member and the closing member.

3. The vehicle heat exchange apparatus according to claim 2, wherein
  the duct member is fastened to the vehicle body frame through the flange member.

4. The vehicle heat exchange apparatus according to claim 2, wherein
  an edge member of the vehicle body frame is projected in the space inside the duct member, and a reinforcing rib is provided near the edge member.

5. The vehicle heat exchange apparatus according to claim 2, further comprising:
  a bracket fastened to the bottom member of the duct member through a cushioning member, wherein
  an end member of the bracket is extended upward on a side of the duct member, and is fastened to the vehicle body frame.

6. The vehicle heat exchange apparatus according to claim 1, further comprising:
  a pipe for supplying heat medium to the heat exchanger, wherein
  the pipe is extended laterally of the heat exchanger below the closing member.

7. The vehicle heat exchange apparatus according to claim 1, wherein
  the air intake port is provided below a center portion in a height direction of the air inlet member.

8. The vehicle heat exchange apparatus according to claim 1, wherein
  the heat exchanger is an ATF cooler for cooling hydraulic oil or lubricating oil of an automatic transmission.

9. A vehicle heat exchange apparatus, comprising:
  a heat exchanger provided rearward of a front bumper formed with an air intake port, and having an air inlet member on a front face of the heat exchanger; and
  a passage forming member provided between the front bumper and the heat exchanger, and forming a passage for passing cooling air from the air intake port of the front bumper to the air inlet member of the heat exchanger, wherein
  the heat exchanger is provided inclined so that an upper end portion is positioned rearward of a lower end portion,
  the passage forming member has:
    a duct member having: a top member; a bottom member facing the top member; and a pair of side members interconnecting the top member and the bottom member, and forming a part of the passage with a space enclosed by the top member, the bottom member and the pair of side members; and
    a closing member installed between the top member of the duct member and the upper end portion of the heat exchanger, wherein
    a vehicle body frame projecting below the top member of the duct member is provided between the top member of the duct member and the closing member.

10. The vehicle heat exchange apparatus according to claim 9, wherein the closing member is extended horizontally above the top member of the duct member.

11. The vehicle heat exchange apparatus according to claim 9, wherein the duct member has a flange member projected from the top member, and is fastened to the vehicle body frame through the flange member.

12. The vehicle heat exchange apparatus according to claim 9, wherein
  an edge member of the vehicle body frame is projected in the space inside the duct member, and a reinforcing rib is provided near the edge member.

13. The vehicle heat exchange apparatus according to claim 9, further comprising:
  a bracket fastened attached to the bottom member of the duct member through a cushioning member, wherein an end member of the bracket is extended upward on a side of the duct member, and is fastened to the vehicle body frame.

14. The vehicle heat exchange apparatus according to claim 9, further comprising:
a pipe for supplying heat medium to the heat exchanger, wherein
the pipe is extended laterally of the heat exchanger below the closing member.

15. The vehicle heat exchange apparatus according to claim 9, wherein
the air intake port is provided below a center portion in a height direction of the air inlet member.

16. The vehicle heat exchange apparatus according to claim 9, wherein
the heat exchanger is an ATF cooler for cooling hydraulic oil or lubricating oil of an automatic transmission.

* * * * *